April 24, 1962 R. K. GALLOWAY 3,030,869
CARTON FEEDING AND ERECTING MECHANISM
Original Filed April 30, 1956 11 Sheets-Sheet 1
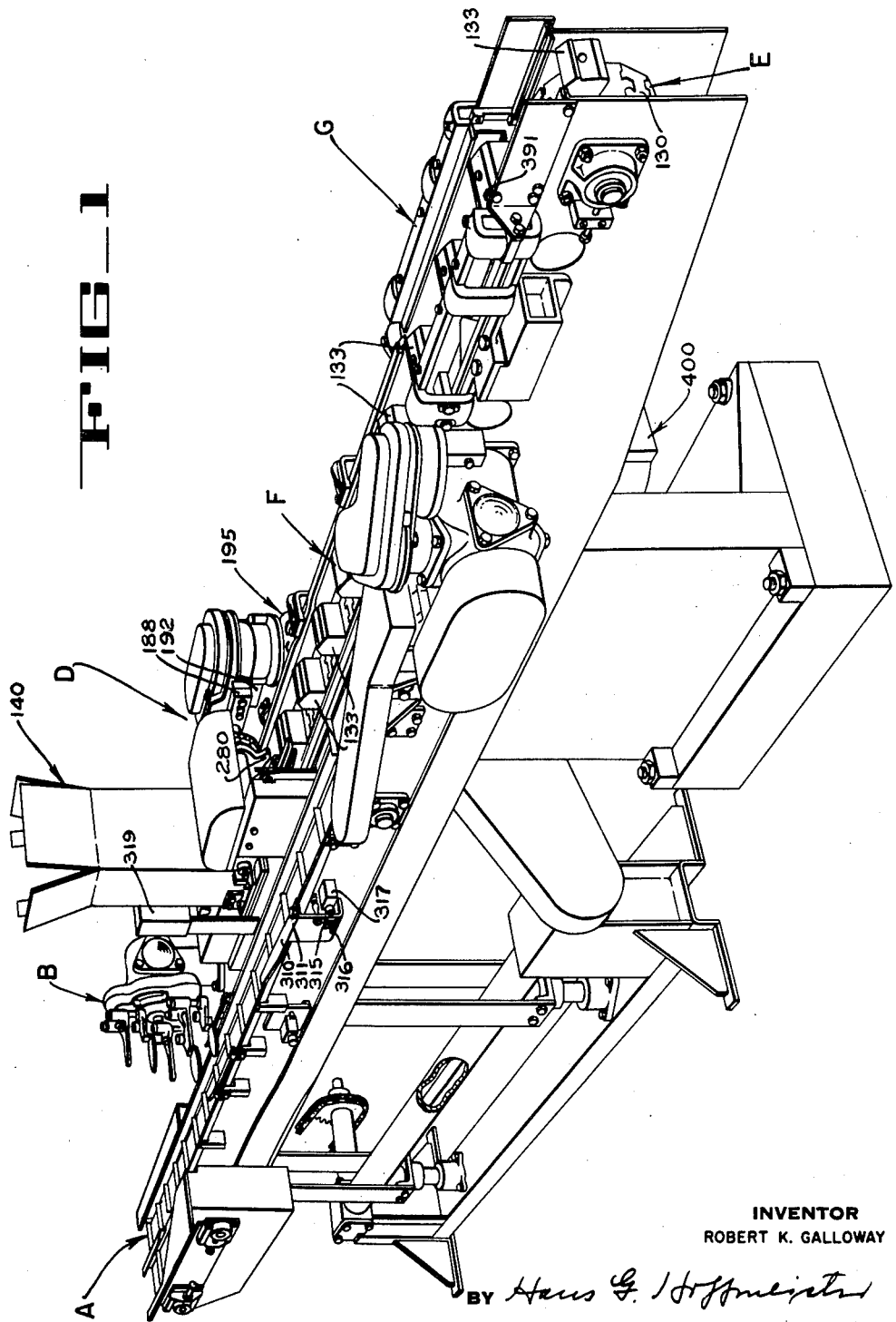
INVENTOR
ROBERT K. GALLOWAY
BY Hans G. Hoffmeister
ATTORNEY April 24, 1962 R. K. GALLOWAY 3,030,869
CARTON FEEDING AND ERECTING MECHANISM
Original Filed April 30, 1956 11 Sheets-Sheet 2
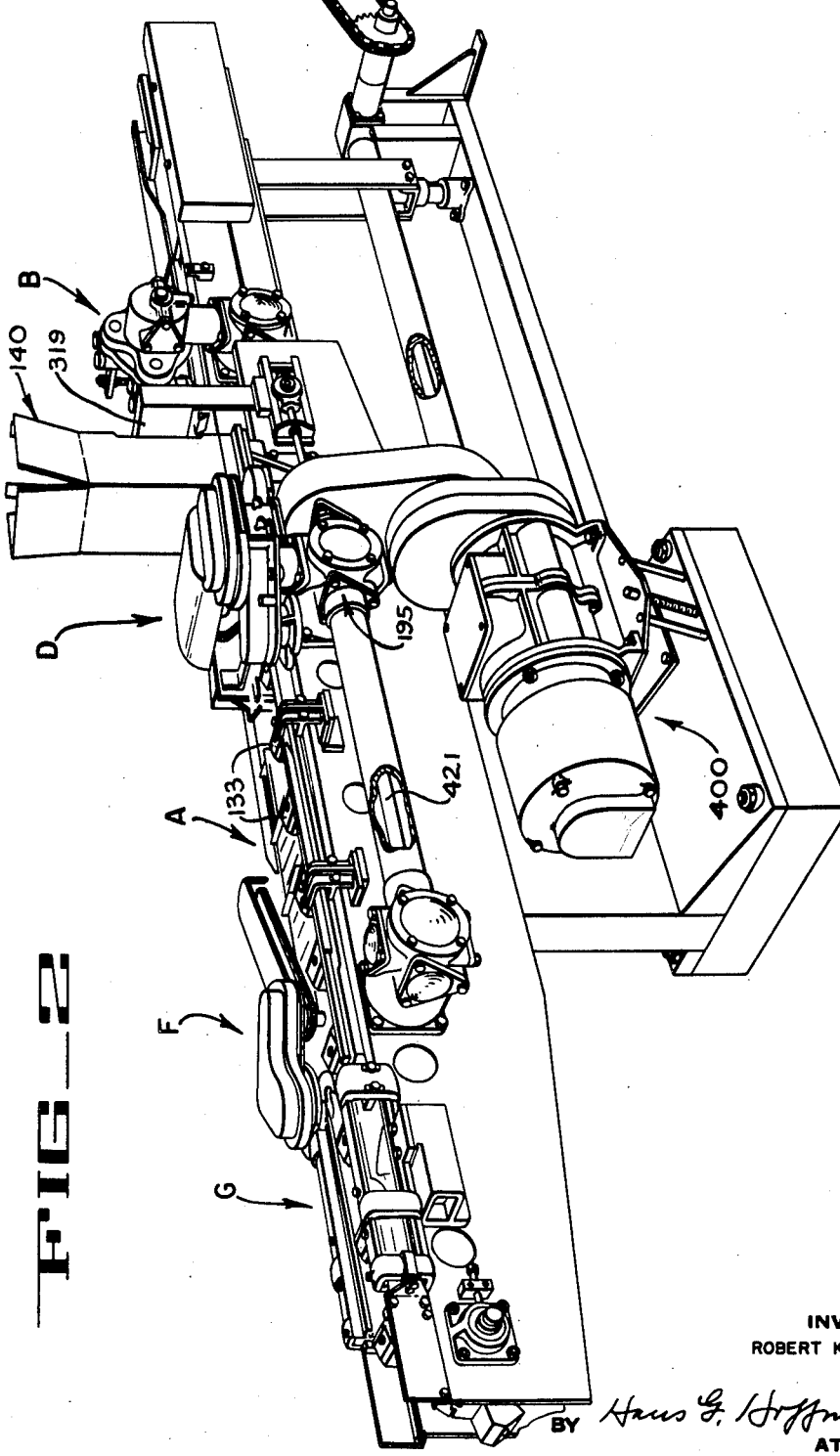
FIG_2
INVENTOR
ROBERT K. GALLOWAY
BY Hans G. Hoffmeister
ATTORNEY April 24, 1962
R. K. GALLOWAY
3,030,869
CARTON FEEDING AND ERECTING MECHANISM
Original Filed April 30, 1956
11 Sheets-Sheet 3
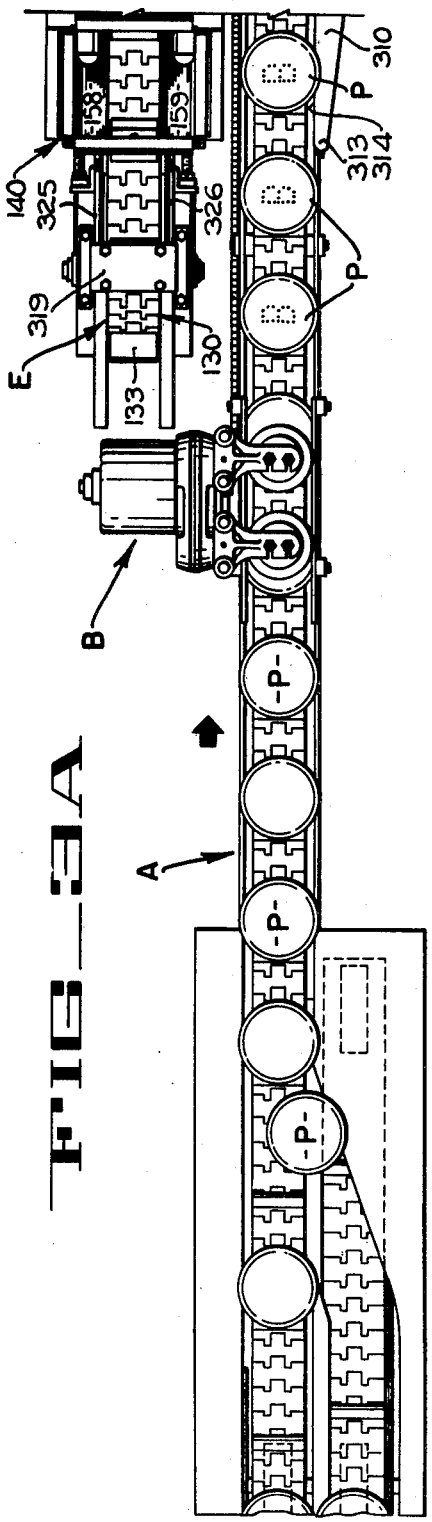
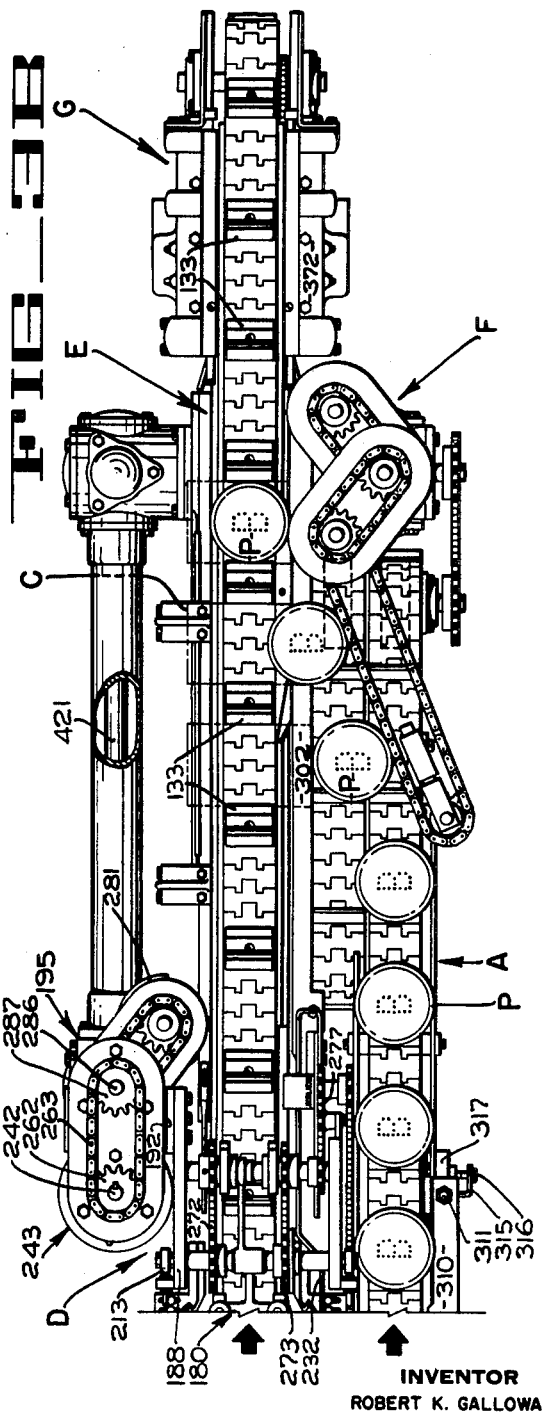
INVENTOR
ROBERT K. GALLOWAY
BY *Hans G. Hoffmeister*
ATTORNEY

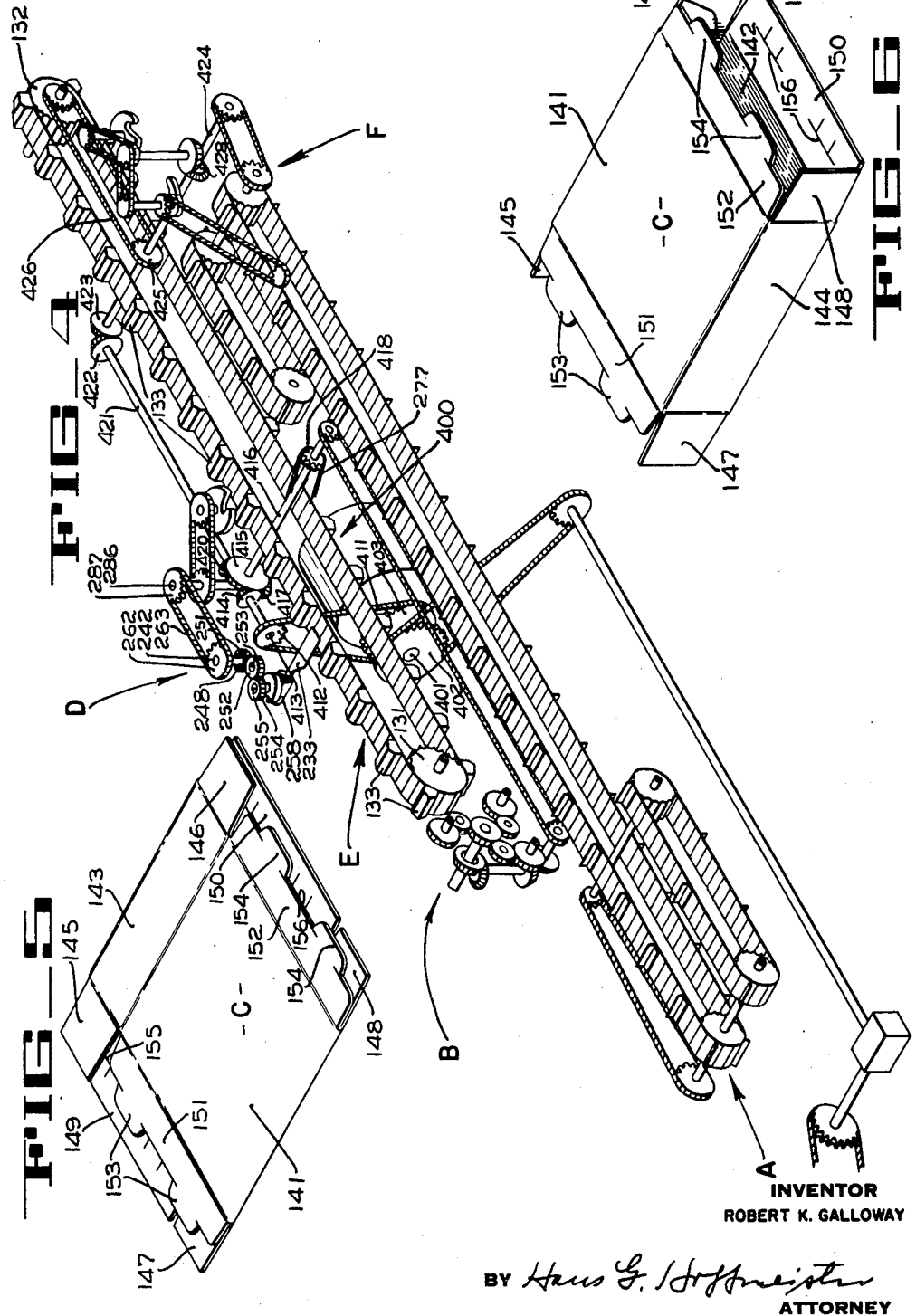

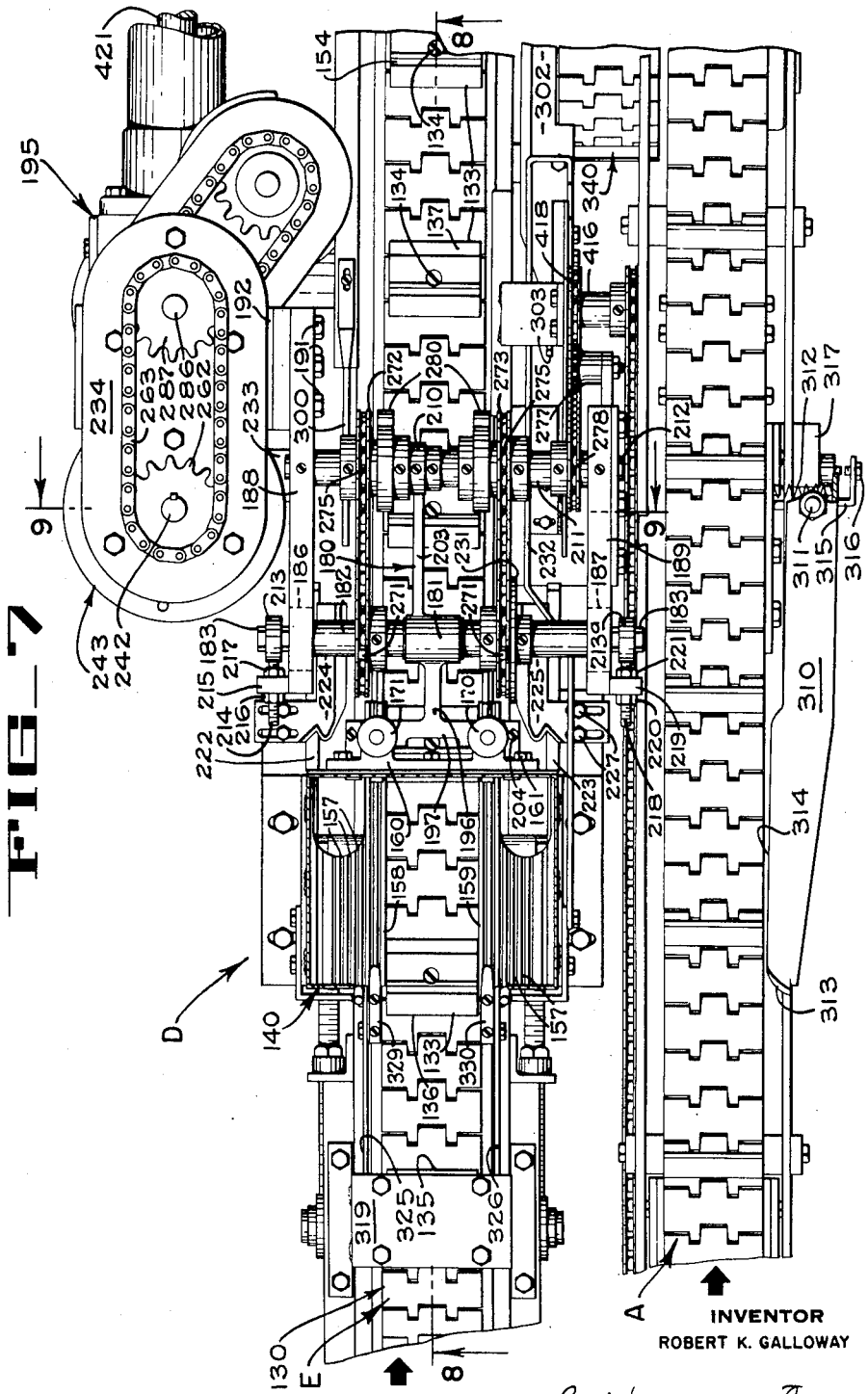

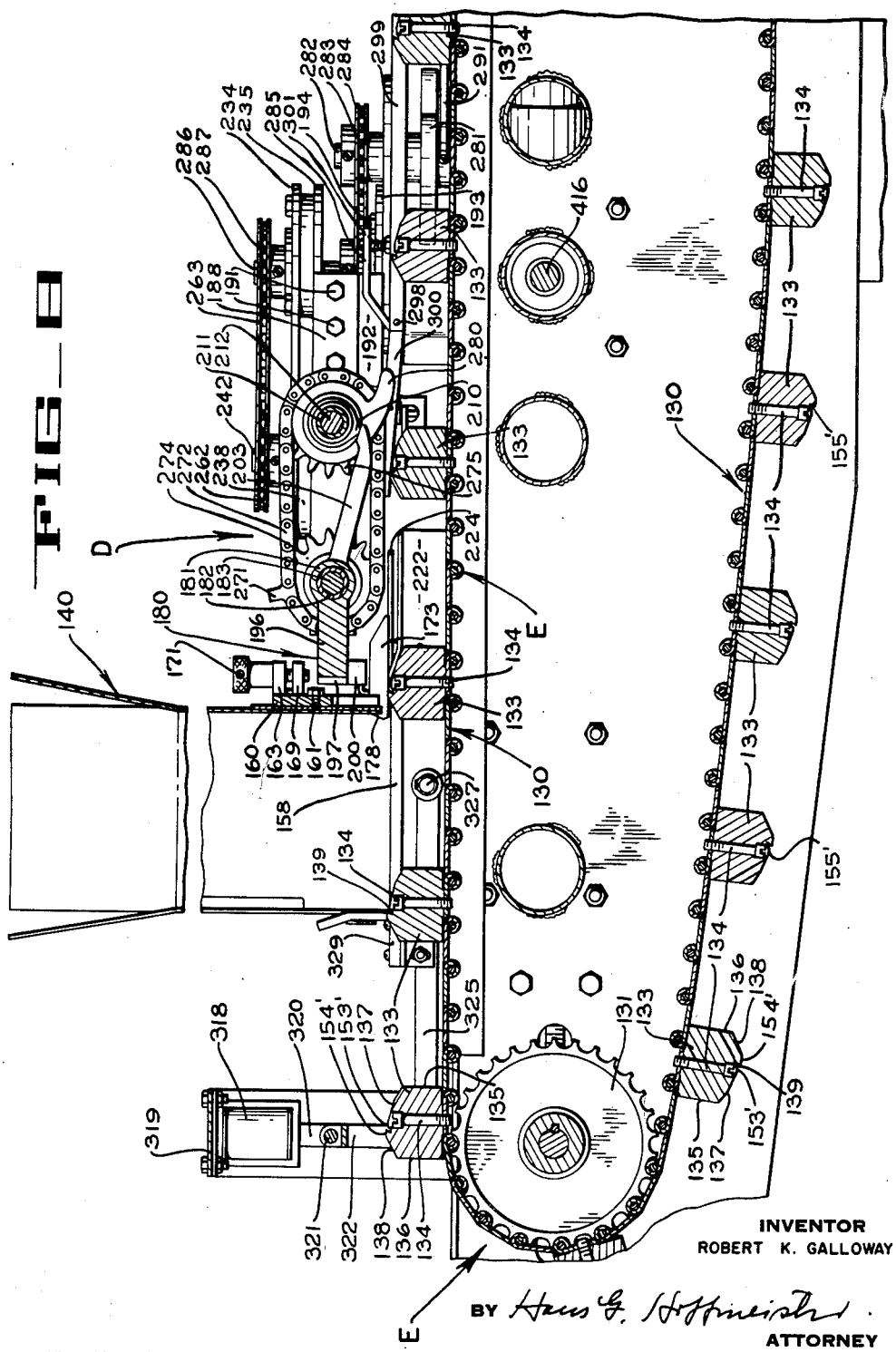

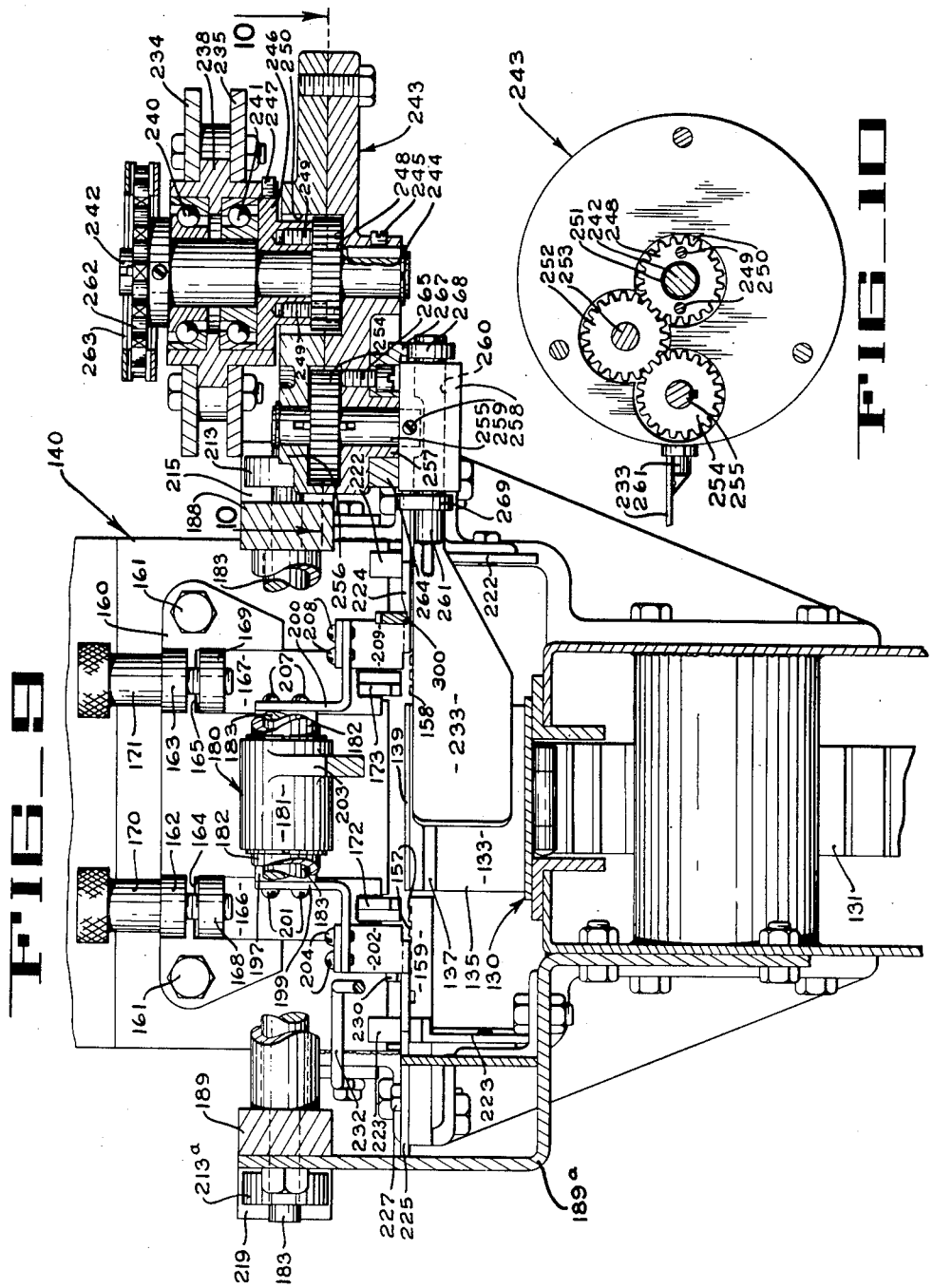

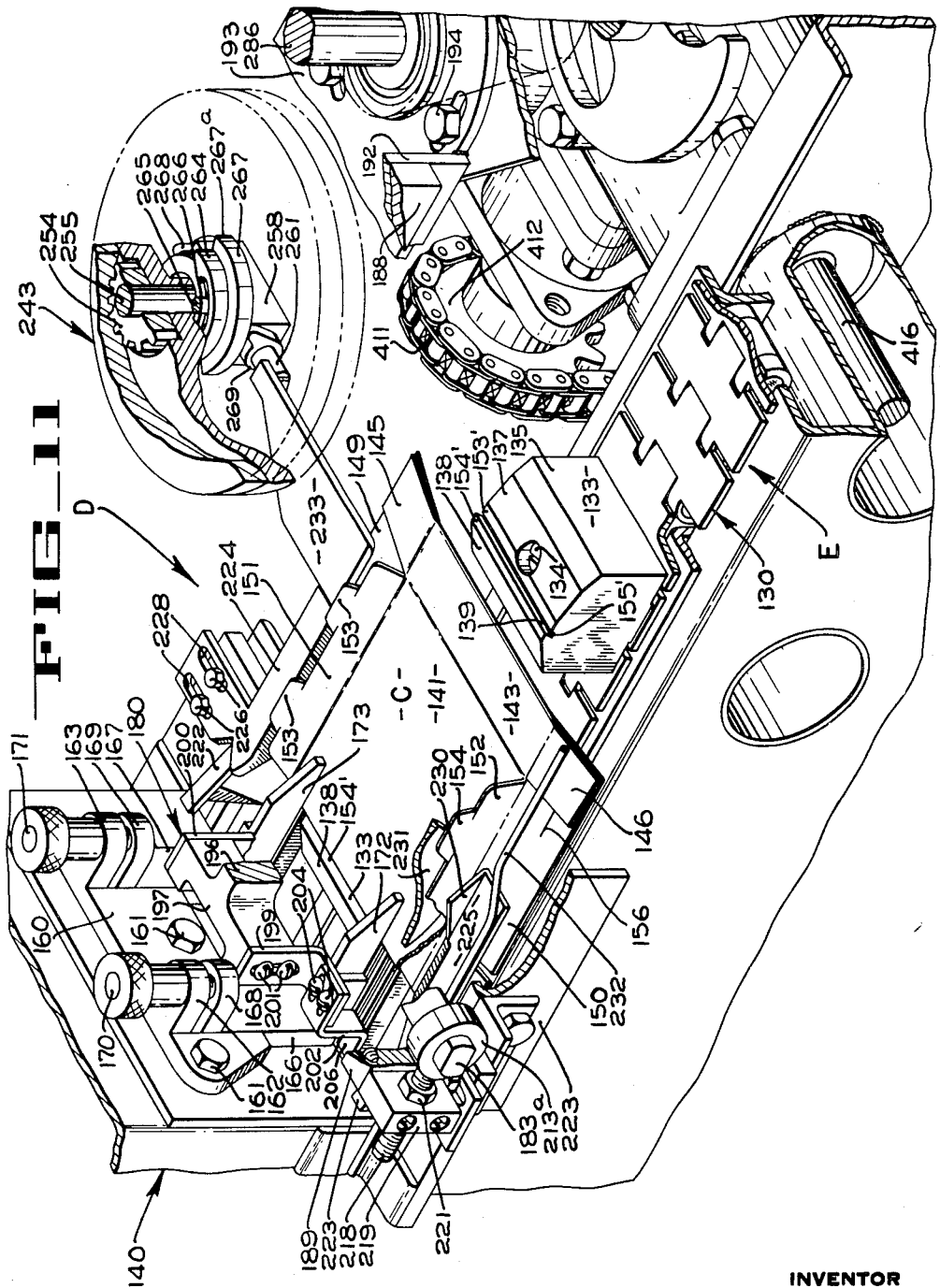

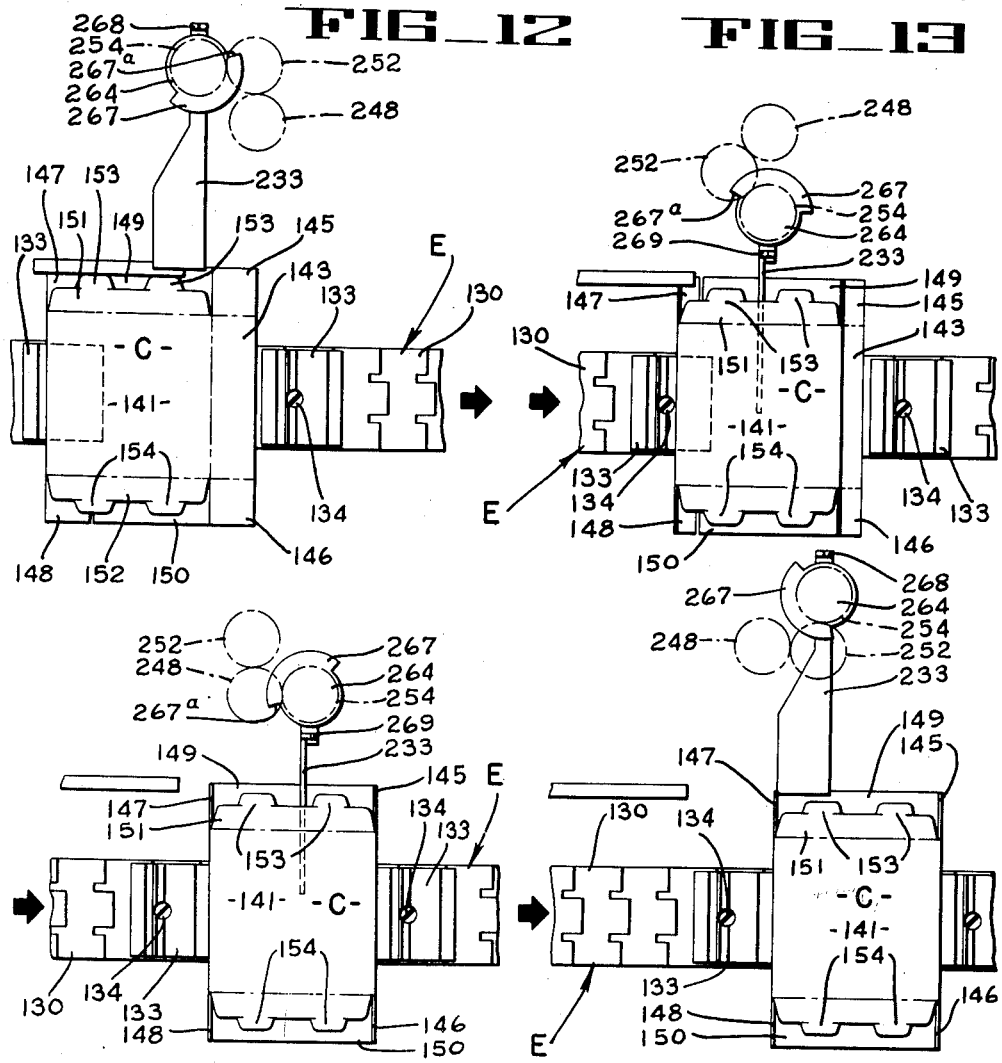
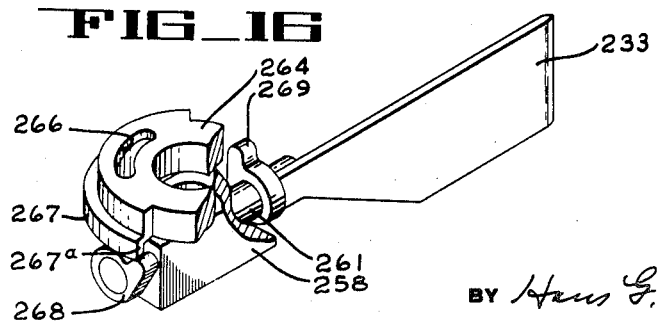

April 24, 1962 R. K. GALLOWAY 3,030,869
CARTON FEEDING AND ERECTING MECHANISM
Original Filed April 30, 1956 11 Sheets-Sheet 10
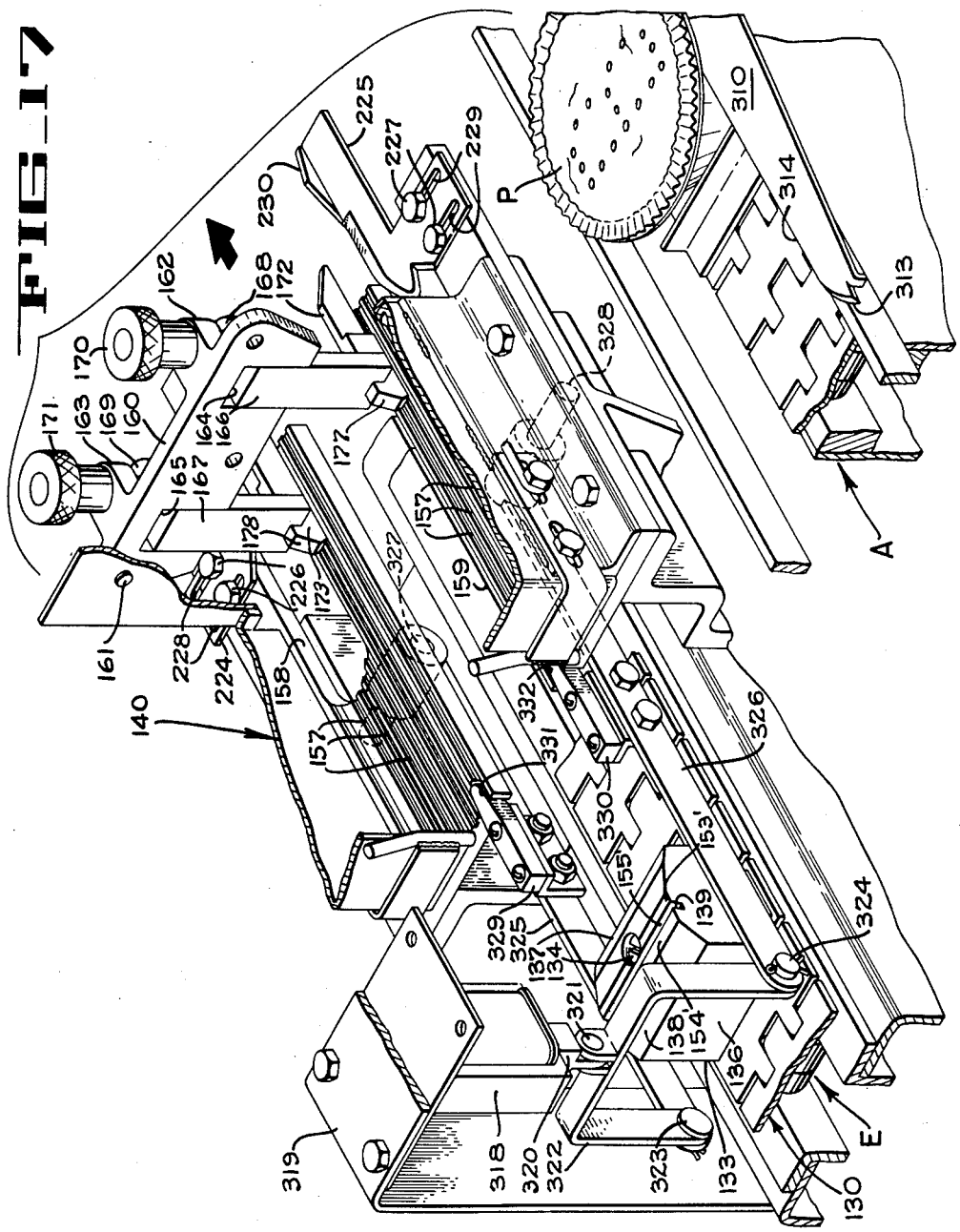
INVENTOR
ROBERT K. GALLOWAY
BY Hans G. Hoffmeister.
ATTORNEY

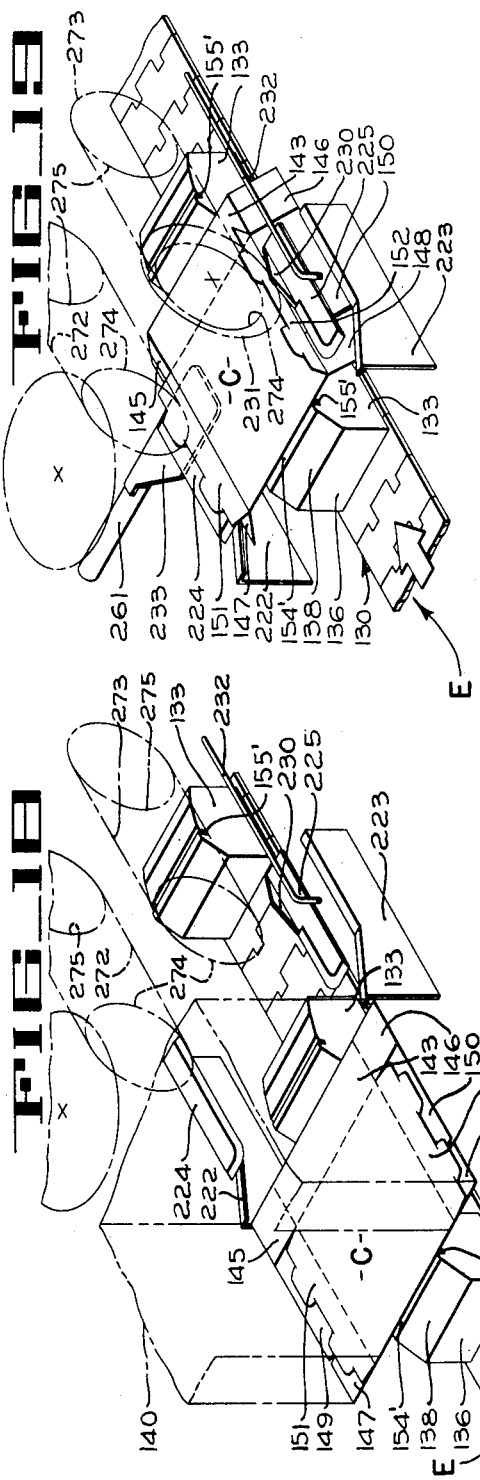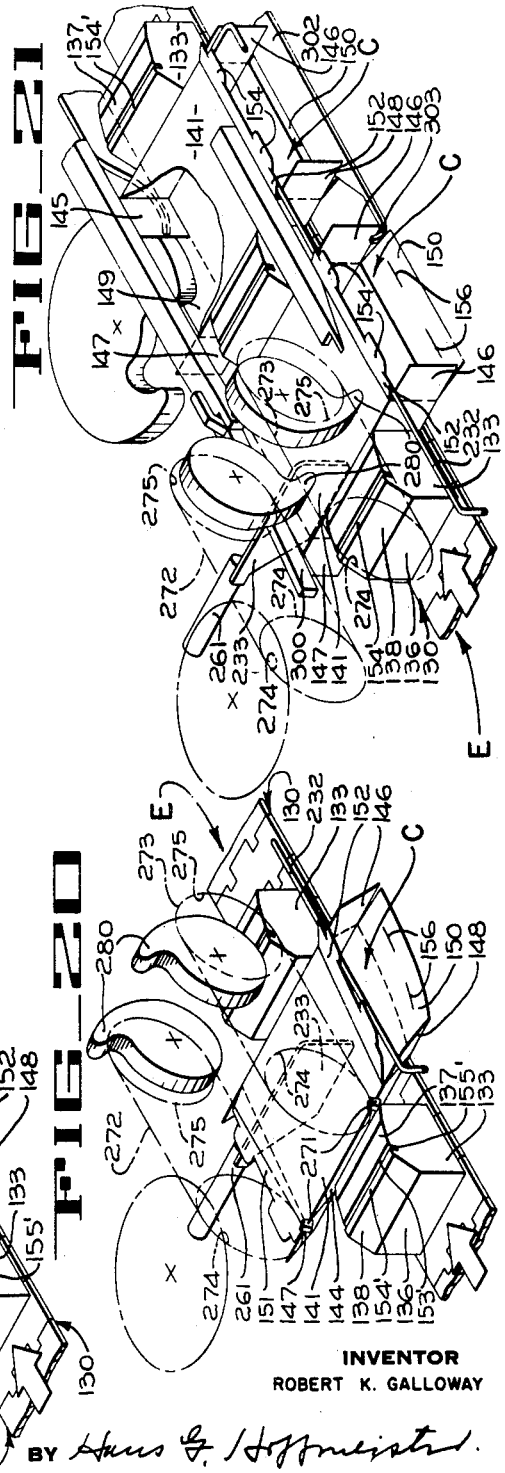

United States Patent Office 3,030,869
Patented Apr. 24, 1962

3,030,869
CARTON FEEDING AND ERECTING MECHANISM
Robert K. Galloway, Hoopeston, Ill., assignor to FMC Corporation, a corporation of Delaware
Original application Apr. 30, 1956, Ser. No. 581,402, now Patent No. 2,906,392, dated Sept. 29, 1959. Divided and this application Sept. 5, 1958, Ser. No. 759,351
14 Claims. (Cl. 93—53)

This invention relates to packaging machines, and particularly to a machine for feeding and erecting cartons.

This application is a division of my copending application Serial No. 581,402, entitled "Machine for Inserting Articles Into Cartons," filed April 30, 1956 which issued as Patent No. 2,906,392 dated September 29, 1959.

One object of the invention is to provide a novel high speed machine for feeding and erecting cartons.

Another object of the invention is to provide a high speed carton feeding and erecting mechanism for use in a machine for cartoning articles such as pies or the like.

Another object of the invention is to provide an efficient, high speed carton feed mechanism for feeding cartons one by one to a carton erecting mechanism.

Other objects and advantages of the invention will become apparent from the following description taken in conjunction with the accompanying drawings in which:

FIG. 1 is a perspective of a pie cartoning machine including the carton feeding and erecting mechanism of the present invention, viewed from the discharge end thereof toward the receiving end, and showing the side of the machine which will be referred to as the right side.

FIG. 2 is a similar perspective, showing the left side of the machine of FIG. 1.

FIGS. 3A and 3B are fragmentary plans which, when assembled end to end, together form a plan of the machine shown in FIGS. 1 and 2.

FIG. 4 is a schematic perspective illustrating the various drive mechanisms of the machine.

FIGS. 5 and 6 are perspectives illustrating in collapsed and open positions, respectively, a carton of the type adapted to be handled by the machine of the invention.

FIG. 7 is a partial plan illustrating the carton feeding and erecting mechanism.

FIG. 8 is a fragmentary central vertical section through the carton erecting mechanism taken on line 8—8 of FIG. 7.

FIG. 9 is a transverse vertical section, with parts broken away, taken on line 9—9 of FIG. 7 and illustrating the mounting of the carton erecting blade.

FIG. 10 is a horizontal section taken on line 10—10 of FIG. 9 and illustrates the planetary gearing for the carton erecting blade.

FIG. 11 is a perspective, with parts broken away and parts in section, of a portion of the carton erecting mechanism.

FIGS. 12 to 15 are schematic views illustrating successive stages of the action of the carton erecting blade illustrated in FIG. 11.

FIG. 16 is a perspective of the carton erecting blade showing the two cam followers mounted thereon and a portion of the actuating cam.

FIG. 17 is a fragmentary perspective of the carton magazine and the mechanism for preventing feed of a carton if no pie is present on the corresponding section of the pie conveyor.

FIGS. 18 to 21 are schematic perspectives illustrating various operations performed in erecting a carton, inserting a pie therein, and closing the carton.

Referring now to the drawings and particularly to FIGS. 1, 2, 3A and 3B thereof, the packaging machine employing the carton feeding and erecting mechanism D of the invention comprises a pie conveyor A adapted to receive pies from a pie making machine (not shown) and convey the pies past a pie tamping and perforating machine B to a pie inserting station F. The carton feeding and erecting mechanism D is adapted to erect cartons from a flattened condition (FIG. 5) to an open and erect condition (FIG. 6) on a carton conveyor E, disposed parallel to and operating in timed relation with the pie conveyor A. The pie inserting mechanism F is adapted to transfer the pies from the pie conveyor A to the open cartons C on the carton conveyor E, and thereafter the carton conveyor conducts the filled cartons C through a carton closing and locking mechanism G.

For purposes of the present description, the pie receiving end of the machine will hereinafter be referred to as the rear end of the machine, the pie discharged end as the forward end, and the sides will be designated as right and left sides to correspond to the right and left sides, respectively, of a person standing at the rear end looking toward the discharge end of the machine.

As best seen in FIGS. 7 and 8, the carton conveyor E comprises a conveyor belt 130 trained around a sprocket-like drum 131 (FIG. 8) at the rear end of the conveyor E and a similar drum 132 (FIG. 4) at the forward end of the same, and is provided on its upper surface with a plurality of spaced blocks 133, each of which is affixed to the conveyor belt 130 by means of studs 134 in the manner indicated in FIG. 8. As best seen in FIGS. 8 and 11, each of the blocks 133 is provided with vertical front and rear walls 135 and 136, respectively. The upper surface of each of the blocks is formed by an upwardly and rearwardly extending surface 137 and an upwardly and forwardly extending surface 138. The surface 137 terminates in a horizontal flat 153', and similarly the surface 138 terminates in a horizontal flat 154'. The plane of the flat 153' is below the plane of the flat 154' a distance substantially equal to the thickness of a carton in its flat folded condition. A groove 155' is formed in the upper surface of the block 133 between the flats 153' and 154' to collect any wax particles which might be dislodged from the cartons. The rear wall of the groove 155' constitutes a forwardly facing carton-engaging shoulder 139 (FIGS. 8 and 11) on the upper portion of the block 133 adjacent to and spaced rearwardly from the central transverse axis of the block.

The carton erecting mechanism D comprises a vertically disposed rectangular magazine 140 (FIG. 8) mounted above the upper reach of the conveyor 130 and adapted to receive a stack of cartons C in the flattened condition illustrated in FIG. 5. As best seen in FIGS. 5 and 6, the cartons C each comprise a top panel 141, a bottom panel 142, a front side panel 143, and a rear side panel 144. A pair of end flaps 145 and 146 project laterally from the opposite side ends of the panel 143, and similarly, a pair of flaps 147 and 148 project laterally from the side ends of the panel 144. Similarly, flaps 149 and 150 project from the opposite ends of the bottom panel 142, and flaps 151 and 152 project from the opposite ends of the top panel 141. The flaps 151 and 152 attached to the top panel 141 are shorter than the flaps 149 and 150 attached to the bottom panel 142 and the flaps 145, 146, 147 and 148 attached to the front and rear panels 143 and 144. Moreover, the top panel flaps 151 and 152 are provided with outwardly projecting tabs 153 and 154 adapted to be received within suitable slits 155 and 156 correspondingly located in the flaps 149 and 150, respectively.

Returning now to the carton feed mechanism as illustrated in FIGS. 7, 8, 9, 11 and 17, the cartons C are placed in the magazine 140 (FIG. 8) with the crease line between the front panel 143 and the bottom panel 142 facing in the direction of travel of the carton conveyor E. The magazine 140 is provided with a pair of carton supporting plates 158 and 159 (FIG. 7) adjacent its lower end. The plates 158 and 159 are spaced apart far enough for the conveyor blocks 133 to pass between them and are so located as to support the lowermost carton of the stack at a height whereby the rearmost end of the carton will be engaged by the shoulder 139 on one of the blocks 133 passing beneath the magazine 140 in order to strip the lowermost carton from the stack within the magazine and advance said carton with said conveyor E. Therefore, as the carton is thus carried forward, its trailing side panel 144, which is substantially in planar alignment with the bottom panel 142, is supported by the forwardly and downwardly inclined surface 137 with the crease line between the panels 144 and 142 slightly in advance of the vertical plane of the leading face of the block, as is apparent in FIG. 19. The upper surface of the plates 158 and 159 are each provided with a plurality of longitudinally extending grooves 157 to collect any wax particles which may be dislodged from the cartons.

A fixed gate mechanism, best illustrated in FIGS. 9 and 11, is provided adjacent the front wall of the magazine 140 to insure that only one carton may be removed therefrom at a time. The gate mechanism is adjustable and comprises a bracket 160 fixed to the forward face of the magazine 140 adjacent the lower end thereof by a plurality of cap screws as indicated at 161. The bracket 160 has a pair of forwardly extending ears 162 and 163 integral therewith adjacent its upper edge. A pair of suitable grooves 164 and 165 (FIG. 9) are formed in the bracket immediately below the ears 162 and 163. Two L-shaped gate members 166 and 167 are slidably mounted in the grooves 164 and 165. Near its upper end, the member 166 is provided with a forwardly extending flange 168 in parallel relation with the ear 162 on the bracket 160, and similarly, the member 167 is provided with a forwardly extending flange 169 in parallel relation with the ear 163 on the bracket 160. An adjusting screw 170 extends through a suitable aperture in the ear 162 and is threadedly received in the flange 168 on the member 166, whereby rotation of the screw 170 will adjust the lower end of the member 166 with respect to the bottom plate 159 within the magazine 140. A similar adjusting screw 171 is similarly connected to the flange 169 and effects a similar adjustment of the member 167 with respect to the plate 158 within the magazine 140. The lower ends of the members 166 and 167 are provided with cam blocks 172 and 173, respectively, (FIG. 11) which are elongated in the direction of movement of the cartons to act as top guides therefor. As best seen in FIG. 17, the rearmost ends of the cam blocks 172 and 173 are provided with downwardly and rearwardly inclined cam surfaces 177 and 178, respectively, which stagger the cartons at the lower end of the magazine and move the lowermost carton rearwardly against the rear wall of the magazine 140 to insure proper seating of each carton against the shoulder 139 on one of the blocks 133. The lower surfaces of the blocks 172 and 173 are adjusted by rotation of the adjusting screws 170 and 171 to a height above the plates 158 and 159 approximately equal to a carton thickness whereby only one carton can issue at a time from the magazine 140.

A movable gate mechanism indicated in general at 180 is best illustrated in FIGS. 7, 8, 9 and 11 and comprises a hub 181 (FIG. 8) rotatably mounted on a sleeve 182 which in turn is rotatably mounted on a transverse shaft 183. The shaft 183 extends transversely above the conveyor 130 and has its opposite ends slidably received within longitudinal slots 186 and 187 (FIG. 7) formed in parallel, horizontal bars 188 and 189, respectively, which are mounted on the frame of the machine one adjacent each side of the conveyor E, forwardly of the magazine 140. The bar 188 is secured by a plurality of studs 191 to a vertical plate 192 projecting upwardly from a horizontal plate 193 (FIG. 8) secured by bolts 194 to a gear casing 195 (FIGS. 3B and 7) which is mounted on the frame structure. The bar 189 (FIGS. 7 and 9) is fixed to a bracket 189a which is directly connected to the frame of the machine as shown in FIG. 9. An arm 196 extends rearwardly from the hub 181 in the manner illustrated in FIG. 8, and terminates in a crosshead 197 (FIGS. 8 and 11). As best seen in FIGS. 9 and 11, two identical but oppositely disposed angle brackets 199 and 200 are adjustably secured to the opposite ends of the crosshead 197. The bracket 199 is connected to the right end of the crosshead 197 by machine screws 201 extending through suitable slots in the bracket. A stop member 202 is connected to the bracket 199 by machine screws 204. The downwardly depending portion of the stop member 202 is bent rearwardly in the manner indicated at 206 in FIG. 11, to lie on the bottom plate 159 of the magazine in a position to contact the foremost edge of the lowermost carton in the magazine 140 and prevent forward movement thereof until the movable gate 180 is raised in a manner hereinafter described. The second angle bracket 200 is connected to the left end of the crosshead 197 by machine screws 207 (FIG. 9) and a second stop member 209, identical to the stop member 202, is connected to the bracket 200 by machine screws 208.

A second arm 203 (FIG. 8) integral with the hub 181 extends forwardly therefrom and has a portion disposed beneath a cam 210 fixed to a sleeve 211 rotatably mounted on a fixed transverse shaft 212 extending between the bars 188 and 189 parallel to and forwardly of the shaft 183. When the mechanism is operated and the sleeve 211 is rotated, the cam 210 rocks the gate mechanism 180 clockwise (FIG. 8) about the sleeve 182 to raise the stop members 202 and 209 at the same time that the rear edge of the lowermost carton C in the magazine 140 is contacted by the shoulder 139 on a block 133 of the carton conveyor E. Thus it is seen that the movable gate member 180 prevents any forward movement of the carton C from the magazine 140 until it is properly seated against the shoulder 139 of the block 133. The movable gate mechanism returns to its counterclockwise position by gravity after the carton C has passed therebeneath.

The opposite ends of the shaft 183 have mounted thereon collars 213 and 213a, respectively (FIG. 7). The collar 213 has rigidly attached thereto a rearwardly extending stud 214 which extends through a suitable aperture formed in the block 215 connected to the rearmost end of the bar 188, and pair of nuts 216 and 217 are threaded on the stud 214 one on either side of the block 215 to adjust the position of the shaft 183 relative to the bar 188. Similarly, a stud 218 is fixed to the collar 213a and extends rearwardly therefrom through a suitable aperture in a block 219 fixed to the rearmost end of the bar 189. A similar pair of nuts 220 and 221 are threaded onto the stud 218 one on either side of the block 219 to adjust the position of the shaft 183 relative to the bar 189.

As a carton is removed from the magazine 140 by one of the blocks 133 on the carton conveyor E, the outermost edges of the flaps 145 and 146 are contacted by the under surfaces of a pair of downwardly and forwardly inclined cam guides 222 and 223, respectively (FIGS. 7, 11 and 18), and are cammed downwardly thereby. The guides 222 and 223 are mounted in any suitable manner on the frame of the machine adjacent the path of the conveyor E and are spaced outwardly from the center line thereof a distance sufficient to catch the outermost edges of the flaps 145 and 146 and the flaps 149 and 150, respectively, of the carton C and at the same time, permit the flaps 151 and 152 thereof to pass therebetween without being engaged thereby. A pair of horizontal splitting blades 224 and 225 (FIG. 7) are adjustably mounted adjacent the left and right sides of the con- 141 of the open carton and force the carton downwardly into seated relation with the upper surface of the conveyor E, with the front and rear panels 143 and 144 of the carton embraced between the vertical faces 136 and 135, respectively, of two adjacent blocks 133 on said conveyor and with the end flaps extending laterally beyond the right and left sides of the conveyor E in the manner illustrated schematically in FIG. 21.

Means are provided to prevent the feed and erection of a carton from the magazine 140 into the space on the carton conveyor E corresponding to a space on the pie conveyor A in which there is no pie. This mechanism is best illustrated in FIGS. 7 and 17 and comprises an arm 310 pivotally mounted for rotational movement about a vertical shaft 311 suitably mounted adjacent the right edge of the pie conveyor A. A compression spring 312 is interposed between the foremost end of the arm 310 and a side plate of the machine and urges the arm 310 to rotate in a clockwise direction as viewed in FIG. 7 so that the rearmost end extends inwardly above the pie conveyor A into the path of the pies being conveyed thereon. The rearmost end 313 of the arm 310 is rounded so that the pies moving on the conveyor A will move the arm 310 counterclockwise about its pivot shaft 311. The inner side of the arm 310 is provided with an elongated straight portion 314 which is adapted to remain in contact with the pies being conveyed on the conveyor A, whereby as long as there are pies in each successive pie position on the conveyor A, the arm 310 will remain in its outward position and is permitted to swing inwardly only adjacent a pie position at which there is no pie. A bracket 315 is connected to the foremost end of the arm 310 and adjustably carries a stud 316 which is adapted to strike and actuate a microswitch 317 when the arm is rotated in a counterclockwise direction by a pie on the conveyor A. The microswitch 317 is a normally closed switch but is moved to and is held in its open position by the stud 316 when arm 310 is in contact with a pie. Thus, it can be seen that the microswitch 317 is closed and permits current to pass only when there is a gap in the procession of pies on the conveyor A.

Turning now specifically to FIG. 17, the microswitch 317 is connected in the circuit of a solenoid 318 mounted above the carton conveyor E, rearwardly of the magazine of the carton erecting mechanism, by an inverted U-shaped bracket 319 fixed to the frame of the machine. The plunger 320 of the solenoid 318 is pivotally connected by a pin 321 to an inverted U-shaped yoke 322. The lower ends of the yoke 322 are pivotally connected by pins 323 and 324 to the rearmost ends of a pair of arms 325 and 326, respectively, the forward ends of which extend forwardly beneath the magazine 140 of the carton erecting mechanism D. The forward ends of the arms 325 and 326 are pivotally mounted on stub shafts 327 and 328, respectively, fixed to the frame of the machine. Fixed to the arms 325 and 326, intermediate the ends thereof, are a pair of lifting members 329 and 330 adjacent the rear end of the carton magazine 140 and extending through suitable slots 331 and 332 formed in the rear edges of the bottom plates 158 and 159 of the magazine 140.

When the microswitch 317 is held in its open position by the arm 310 being moved outwardly by a pie on the conveyor A in the manner indicated in FIG. 17, the solenoid 318 is de-energized and the upper surfaces of the lifting members 329 and 330 are coplanar with or below the upper surfaces of the bottom plates 158 and 159 of the magazine 140, and the cartons are fed successively therefrom in the manner described above. When a position on the pie conveyor A, at which there is no pie, reaches the arm 310, the arm is permitted to swing inwardly thus permitting the contacts in the microswitch 317 to close and energize the solenoid 318 to raise the yoke 322 and rotate the arms 325 and 326 about the stub shafts 327 and 328. The lifting members 329 and 330 lift the bottommost carton in the magazine 140 above the plane of the uppermost edges of the blocks 133 on the carton conveyor E, thereby preventing the feed of a carton into the position on the carton conveyor E corresponding to the position on the pie conveyor A at which there is no pie.

As best illustrated in FIG. 4, the drive mechanism for the various assemblies described above comprises a motor and a variable ratio gear reducing unit 400 having an output shaft 401 to which there is affixed a drive sprocket 403.

The sprocket 403 is connected by a chain 411 to a sprocket 412 on a line shaft 413. A bevel gear 414 fixed to the line shaft 413 meshes with a bevel gear 415 on a transverse shaft 416 which meshes with a bevel gear 417 on the hereinabove mentioned vertical shaft 286 from which the mechanism for operating the carton erecting blade 233 is driven. A sprocket 418 on the shaft 416 drives the chain 277 whereby the carton erecting lugs 271 are actuated.

The carton conveyor E is driven by a bevel gear 420 on one end of a line shaft 421, which meshes with and is driven by the bevel gear 415. The line shaft 421 drives a transverse shaft 424 through matched bevel gears 422 and 423. A sprocket 425 on the shaft 424 is connected by a chain 426 to a sprocket 427 fixed to the drum 132 of the carton conveyor E.

In the operation of the carton feeding and erecting mechanism D, the cartons C are placed in the magazine 140 in their flat folded condition (FIG. 5). As each of the blocks 133 passes under the magazine 140 the shoulder 139 thereon engages the bottom carton in the magazine and moves it forwardly out of said magazine. As the carton C is moved out of the magazine, the outermost edges of the front flaps 147 and 148, the bottom flaps 149 and 150 and the rear flaps 145 and 146 engage the cam guides 222 and 223 (FIGS. 11 and 18) and are cammed downwardly away from the top flaps 151 and 152. The top flaps 151 and 152 are cammed upwardly by the splitting blades 224 and 225.

The initial opening of the carton C is effected by the flat erecting blade 233 which enters the carton from the left side between the now separated upper and lower end flaps while said blade is in its horizontal position (FIG. 19). The blade 233 is then rotated to its vertical position to separate the top panel 141 of the carton from the bottom panel 142 (FIG. 20). A pair of the lugs 271 (FIG. 8) contact the upper rear corner of the carton C and move said corner forward relative to the remainder of the carton to aid the erecting blade 233 in the erection of the carton.

After the carton is substantially fully erected the resilient fingers 280 (FIG. 21) contact the upper surface thereof and force the carton downwardly between the blocks 133 on the conveyor E. The carton is now fully erected and blocked between adjacent blocks 133, and is in condition to be filled.

From the foregoing description it may be seen that the present invention defines a novel, efficient, high speed, automatic mechanism for feeding and erecting cartons.

While a preferred embodiment of the carton feeding and erecting mechanism of the present invention has been shown and described herein with reference to a device for cartoning pies, it is obvious that various changes can be made in its construction without departing from the spirit of the inveniton as defined in the appended claims.

Having thus described my invention, what I claim and desire to secure by Letters Patent is:

1. In a carton feeding and erecting machine, a carton conveyor, a carton supply magazine mounted above said conveyor, a plurality of blocks mounted on said conveyor in regular spaced relation therealong, an upwardly projecting forwardly facing abutment member on the upper surface of each of said blocks, the height of each abutment member above said surface being approxiamately equal to the thickness of a carton in flat folded condition in said veyor E, respectively, forwardly of and above the guides 222 and 223, by studs 226 and 227 extending through suitable laterally extending slots 228 and 229 in the splitting blades 224 and 225, respectively. The splitting blades have their innermost edges beveled downwardly and inwardly and extend inwardly toward the center line of the conveyor E a distance sufficient to underlie, and cam upwardly, the flaps 151 and 152 hingedly connected to the top panel 141 of the carton C.

An upwardly projecting cam 230 (FIG. 11) is formed integrally with and extends upwardly from the inner edge of the splitting blade 225 adjacent the foremost portion thereof and is adapted to bend the flap 152 upwardly along the crease line separating said flap from the top panel 141 of the carton. A vertically extending disc 231 is rotatably mounted on the sleeve 182 adjacent the right end thereof as shown in FIG. 7. The peripheral edge of said disc 231 is adapted to press downwardly against the top panel 141 of the carton C adjacent the crease line separating the panel from the flap 152 and thereby to cooperate with the cam 230 in folding the flap 152 upwardly along said crease line. As the carton C moves beyond the cam 230, the flap 152 again swings downwardly until it engages a rod 232 extending parallel to the conveyor 130, and is held thereby in an upwardly bent relation until the erection of the carton has been completed.

The initial opening of the carton is effected by a carton erecting blade 233 mounted on the left side of the conveyor 130 at a point adjacent the foremost end of the splitting blade 224. Referring now specifically to FIGS. 9, 10 and 11, a pair of plates 234 and 235 are rigidly connected to the frame of the machine. The plates 234 and 235 extend rearwardly from the gear casing 195 and provide a stationary support for the actuating mechanism of the erecting blade. A sleeve 238 (FIG. 9) is fixed to the plates 234 and 235 and rotatably supports, by means of bearings 240 and 241, a vertically extending shaft 242 therewithin. A rotating gear housing 243 is held on the lower end of the shaft 242 by a snap ring 244 and is connected to said shaft for rotation therewith by a set screw 245. A hub 246 surrounds the shaft 242 and is adjustably connected to the stationary sleeve 238 by a set screw 247. A stationary sun gear 248 (FIGS. 9 and 10) is fixed to the lower end of the hub 246 by a pair of studs 249, said gear being received within a suitable opening 250 centrally located in the upper portion of the gear housing 243, and being provided with a suitable central opening 251 through which the shaft 242 extends. An idler gear 252 (FIG. 10) is rotatably mounted on a stub shaft 253 fixed within the gear housing 243 and meshes with the stationary sun gear 248 and with a planet gear 254 (FIGS. 9, 10 and 11) fixed to a shaft 255 rotatably mounted in suitable upper and lower bearing bosses 256 and 257, respectively (FIG. 9), provided on the gear housing 243. The lower end of the shaft 255 projects downwardly below the lower surface of the housing 243 and is secured to a block 258 by a suitable set screw 259. The block 258 is provided with a horizontally extending bore 260 which rotatably receives a shaft 261 which, in turn, is welded to the carton erecting blade 233. A main drive sprocket 262 is fixed to the upper end of the shaft 242 and is driven by a suitable drive chain 263 driven by a sprocket 287 (FIGS. 3B, 4, and 7) mounted on a rotatably mounted vertical shaft 286 driven in a manner hereinbelow described. With this arrangement, when the shaft 242 is rotated the housing 243 and the gears 252 and 254 will be carried bodily around the stationary gear 248. The gears 248, 252 and 254 are so designed that, when the housing 243 is rotated around the fixed gear 248, the block 258 will also be carried in a circular path but will always remain in a position wherein the carton erecting blade 233 projects toward the conveyor E.

As the blade is carried in a rotary path around shaft 242, it is swung from a horizontal to a vertical position, and returned to the horizontal position by a cam ring 264 (FIGS. 9 and 11) mounted on the outer surface of the lower bearing boss 257 and adjustably secured with relation thereto by a stud 265 (FIG. 11) extending through a suitable slot 266 (FIGS. 11 and 16) formed in said sleeve. The stud 265 is threadedly received in a suitably threaded hole (not shown) in the lower surface of the gear housing 243. A downwardly depending cam projection 267 is formed on the sleeve 264. The leading edge 267a of the projection 267 successively engages two cam followers 268 and 269 fixed to the shaft 261, one follower adjacent each end of the block 258, whereby rotation of the cam ring 264 relative to the shaft 255 will cause the carton erecting blade 233 to oscillate between its horizontally disposed position illustrated in FIG. 11, and its vertically disposed position illustrated in FIGS. 9 and 16. The action of the carton erecting blade as the block 258 orbits about the axis of the shaft 242 is illustrated in the series of schematic views FIGS. 12 through 15. FIG. 12 illustrates schematically the position of the carton erecting blade 233 and the cam follower 268 relative to the cam 267 at the initial entry of the blade 233 into the carton C. The cam 267 is in engagement with the follower 269 and is holding the blade 233 in its horizontal position. As the elements progress from the positions shown in FIG. 12 to those shown in FIG. 13, the leading edge 267a of the cam 267 contacts the cam follower 268 and rotates the blade 233 to its vertical position as illustrated in FIG. 20 to initially open the carton by pressing the bottom panel 142 downward into the space between the two associated blocks. FIG. 14 illustrates the blade 233 being withdrawn from the carton at which time the blade is still in its vertical position. FIG. 15 shows the blade 233 fully retracted from the carton and the leading edge 267a of the cam 267 has just contacted the follower 269 to return the blade to its horizontal position in preparation for its entry into the succeeding carton.

The above described entry of the bottom panel 142 into the space between two blocks 133 causes the trailing side panel 144 to pivot upward and forward about the crease line between it and the bottom panel 142 as this crease line is forced downward along the forward face of the trailing block. It is apparent therefore that the forward edge of the sloping surface 137 contributes importantly in the operation of shaping the carton as the blank is unfolded, i.e., as the bottom panel 142 is pushed downward into the space between the two associated blocks 133.

The carton erecting blade 233 is assisted in the erecting of each carton by pairs of transversely aligned lugs 271 (FIGS. 7 and 8) carried on endless chains 272 and 273, each of which is trained over a sprocket 274 that is keyed to the rotatable sleeve 182 and over a sprocket 275 keyed to the rotatable sleeve 211. The lower reaches of the chains 272 and 273 are located at an elevation slightly above the upper edges of the blocks 133 on the carton conveyor E, and the lugs 271 are adapted to project downwardly below the plane of the upper edges of the blocks 133 and to contact the rearmost edge of the carton C, in the manner illustrated in FIG. 20, beyond the lateral ends of the blocks 133 and aid the carton erecting blade 233 in the erection of the carton C by moving the top panel 141 of the carton forwardly relative to the bottom panel 142, the forward end of which abuts the rear face 136 of the preceding block 133. The chains 272 and 273 are driven at a greater linear speed than the speed of the carton conveyor E by a drive chain 277 (FIGS. 4 and 7) meshing with a sprocket 278 fixed to the sleeve 211 adjacent the right end thereof and driven in a manner hereinbelow described.

A pair of resilient fingers 280 are fixed to the sleeve 211 inwardly of the planes of the chains 272 and 273 and are adapted to strike the upper surface of the top panel magazine, each block having a groove in its upper surface in front of said abutment member to collect particles dislodged from the cartons, and support means in said magazine having an opening arranged to permit passage of said abutment members, said support means being adapted to support a stack of cartons in flat folded condition with the lowermost carton at an elevation to be contacted by the abutment member on one of said blocks, whereby said lowermost carton will be moved forwardly from beneath said stack by the abutment member on said one block.

2. In a carton feeding and erecting machine, a carton conveyor, a magazine mounted above said conveyor and arranged to receive a stack of horizontally disposed flat folded cartons, a plurality of blocks mounted on said conveyor in regular spaced relation therealong, each block having an upper flat surface, an upwardly projecting forwardly facing abutment member spaced rearwardly from said upper surface of each of said blocks to define an upwardly opening groove between said flat surface and the abutment member for collecting particles dislodged from the cartons, the height of each abutment member above said flat surface being approximately equal to the thickness of a carton in flat folded condition in said magazine, support means at the lower end of said magazine having an opening arranged to permit passage of said abutment members, said support means being adapted to support a stack of cartons in flat folded condition with the lowermost carton at an elevation to be contacted by the abutment member on one of said blocks, whereby said lowermost carton will be moved forwardly from beneath said stack by the abutment member on said one block, and a fixed gate secured to the forward face of said magazine, said gate being adjustable to locate the lower edge thereof at a point above said stack supporting means a distance approximately equal to the thickness of one flat folded carton and thereby prevent the feeding of more than one carton at a time.

3. In a carton feeding and erecting machine, a carton conveyor, a magazine mounted above said conveyor and arranged to receive a stack of horizontally disposed flat folded cartons, a plurality of blocks mounted on said conveyor in regular spaced relation therealong, each block having an upper flat surface, an upwardly projecting forwardly facing abutment member on the upper surface of each of said blocks, the height of each abutment member above said flat surface being approximately equal to the thickness of a carton in flat folded condition in said magazine, support means at the lower end of said magazine having an opening arranged to permit passage of said abutment members, said support means being adapted to support a stack of cartons in flat folded condition with the lowermost carton at an elevation to be contacted by the abutment member on one of said blocks, whereby said lowermost carton will be moved forwardly from beneath said stack by the abutment member on said one block, a movable gate means adjacent the front wall of said magazine and adapted to contact the forward edge of the lowermost carton in said stack and prevent forward movement thereof until the rear edge thereof is contacted by the abutment member on one of said blocks, cam means for raising said movable gate, and means for operating said cam means in timed relation with said conveyor.

4. In a carton feeding and erecting machine, a carton conveyor, a magazine mounted above said conveyor and arranged to receive a stack of horizontally disposed flat folded cartons, a plurality of blocks mounted on said conveyor in regular spaced relation therealong, each block having an upper flat surface, an upwardly projecting forwardly facing abutment member on the upper surface of each of said blocks, the height of each abutment member above said flat surface being approximately equal to the thickness of a carton in flat folded condition in said magazine, support means at the lower end of said magazine having an opening arranged to permit passage of said abutment members, said support means being adapted to support a stack of cartons in flat folded condition with the lowermost carton at an elevation to be contacted by the abutment member on one of said blocks, whereby said lowermost carton will be moved forwardly from beneath said stack by the abutment member of said one block, a fixed gate secured to the forward face of said magazine, said gate being adjustable to locate the lower edge thereof at a point above said stack supporting means a distance approximately equal to the thickness of one flat folded carton and thereby prevent the feeding of more than one carton at a time, a movable gate means adjacent the front wall of said magazine and adapted to contact the forward edge of the lowermost carton in said stack and prevent forward movement thereof until the rear edge thereof is contacted by the upwardly extending abutment member on one of said blocks, cam means for raising said movable gate, and means for operating said cam means in timed relation with said conveyor.

5. In a carton feeding and erecting machine, a conveyor, means for positioning an open ended carton on said conveyor in flattened condition with one open end facing transversely of said conveyor, a rotary support member mounted for rotation adjacent one side of said conveyor, a blade rotatably mounted on said support member, and gear means operatively connected between said rotary support member and said blade and arranged to maintain said blade with its major axis in fixed angular relation with the conveyor while the support member moves said blade toward and into said open end of the carton and forwardly in the direction of movement of the carton.

6. In a carton feeding and erecting machine, a conconveyor, means for positioning an opened carton on said conveyor in flattened condition with one open end facing transversely of said conveyor, a rotary support member mounted for rotation adjacent one side of said conveyor, a block rotatably mounted on said rotary member, a blade mounted in said block for rotation about its own axis, gear means operatively connected between said rotary support member and said block and arranged to maintain the block so oriented that the blade moves in translatory motion while the support member moves said block in a direction to carry said blade toward and into said open carton end and forwardly in the direction of movement of the carton, and cam means operatively connected between said blade and said rotary support member and arranged to rotate said blade about its axis while said blade projects into said carton.

7. In a carton feeding and erecting machine, a conveyor, means for positioning an open ended carton on said conveyor in flattened condition with the upper end and lower end flaps of one open end facing transversely of said conveyor at one side thereof, a splitting member positioned in the path of movement of the carton and arranged to separate the lower end flaps of the carton from an upper end flap, a carton erecting blade mounted for orbital translatory movement about a vertical axis adjacent said splitting member, and means for moving said blade toward said splitting member and into position between the separated end flaps and simultaneously moving said blade in the direction of movement of the carton.

8. In a carton feeding and erecting machine, a conveyor, means for positioning an open ended carton on said conveyor in flat folded condition with one open end facing transversely of said conveyor, an erecting blade mounted for translatory orbital movement about a vertical axis adjacent said conveyor, means for simultaneously moving said blade into the open end of said carton and forwardly in the direction of movement of said carton, means for rotating said blade to raise the upper panel of the carton away from the lower panel, a chain extending parallel to and above said conveyor, means for driving said chain in the same direction as said conveyor and at a greater speed than said conveyor, and a carton erecting lug on said chain adapted to engage the rear edge of the upper panel of said carton and move said panel forwardly relative to the lower panel thereof and thereby assist the erecting blade in the erection of the carton.

9. In a carton feeding and erecting machine, a conveyor, a plurality of spaced pusher blocks on said conveyor, means for positioning an open ended carton on said conveyor in flat folded condition with one open end facing transversely of said conveyor, an erecting blade mounted for translatory orbital movement about a vertical axis adjacent said conveyor, means for moving said blade into the open end of said carton, means for rotating said blade to raise the upper panel of the carton away from the lower panel, a pair of chains extending parallel to and above said conveyor, means for driving said chains in the same direction as said conveyor and at a greater speed than said conveyor, lugs on said chains adapted to engage the rear edge of the upper panel of the carton and move it forwardly relative to the lower panel thereof to assist said blade in erecting the carton, and a finger mounted for rotation about an axis transverse to said conveyor and above said conveyor, said finger being arranged to strike the upper panel of the carton and push the carton downwardly onto said conveyor between adjacent blocks thereon.

10. In a carton feeding and erecting machine, a conveyor, a plurality of spaced pusher blocks on said conveyor means for positioning an open ended carton on said conveyor in flat folded condition with one open end facing transversely of said conveyor, an erecting blade mounted for translatory orbital movement about a vertical axis adjacent said conveyor, means for moving said blade into the open end of said carton, means for actuating said blade to raise the upper panel of the carton away from the lower panel, a pair of chains extending parallel to and above said conveyor, means for driving said chains in the same direction as said conveyor and at a greater speed than said conveyor, lugs on said chains adapted to engage the rear edge of the upper panel of the carton and move it forwardly relative to the lower panel thereof to assist said blade in erecting the carton, and a pair of resilient fingers mounted for rotation about an axis transverse to said conveyor and above said conveyor, said fingers being arranged to strike the upper panel of the carton and push the carton downwardly onto said conveyor between adjacent blocks thereon.

11. In a carton feeding and erecting machine, a continuously movable carton conveyor, an open bottomed magazine mounted above said conveyor, a plurality of blocks mounted on said conveyor in regular spaced relation therealong, an upwardly projecting forwardly facing shoulder on the upper surface of each of said blocks, the height of each shoulder being approximately equal to the thickness of a carton in flat folded condition so that the lowermost carton in said magazine will be pushed forward from beneath the magazine by a shoulder on one of said blocks, means defining a carton-supporting and shaping surface on said one block, and an elongate blade mounted adjacent the discharge side of said magazine for orbital translatory movement about a vertical axis to effect entry of the blade into said carton and for rotary movement about the blade's longitudinal axis for moving the bottom panel of said carton downward between said one block and the preceding block and concurrently urging a side panel supported by said carton-supporting and shaping surface to slide around said shaping surface to urge said carton into erect condition as it is moved downward into the space between said one block and said preceding block.

12. In a carton handling machine, a movable conveyor, means for positioning an open ended carton on said conveyor in flat folded condition with an open end facing transversely of said conveyor, means on said conveyor defining a carton-shaping pocket having parallel side faces, means on said conveyor defining a carton-shaping surface, said shaping surface intersecting one of said side faces, and an elongate means operable to enter the open end of the carton and rotate about its longitudinal axis to urge one portion of said carton to move over said carton-shaping surface for camming the carton into erect condition as it is moved into the carton-shaping pocket by the elongate means.

13. In a carton handling machine, a movable conveyor, means for positioning an open ended carton on said conveyor in flat folded condition with an open end facing transversely of said conveyor, means on said conveyor defining a carton-shaping pocket having parallel side faces, means on said conveyor defining a carton-shaping surface, said shaping surface intersecting one of said faces, a blade mounted for translatory orbital movement about a vertical axis adjacent said conveyor, means for moving said blade into said open end of the carton and for urging one portion of said carton to move over said carton-shaping surface for camming the carton into erect condition as it is moved into the carton-shaping pocket by said blade.

14. A combined feeding, shaping and erecting apparatus for cartons comprising a magazine for flat folded cartons, a movable conveyor adjacent from said magazine, a plurality of blocks in spaced relation on said conveyor, the distance between successive blocks being substantially equal to the width of a first carton panel, an abutment on each of said blocks for engaging and feeding a carton from the magazine with said first panel in registry with the space between two blocks, means defining a carton supporting and shaping surface on one of said blocks, said surface supporting a second panel of said carton in co-planar alignment with said first panel, an elongate blade mounted for orbital translatory movement about an axis substantially perpendicular to the plane of conveyor movement, means for moving said blade into the carton, and means for rotating said blade about its longitudinal axis for forcing said first panel into the space between said two blocks and concurrently turning said second panel about an edge of said carton-supporting and shaping surface to effect carton erection.

References Cited in the file of this patent

UNITED STATES PATENTS

| | | |
|---|---|---|
| 167,787 | Redstone | Sept. 14, 1875 |
| 2,314,434 | Toelke et al. | Mar. 23, 1943 |
| 2,570,144 | Mettler | Oct. 2, 1951 |
| 2,573,944 | Anderson | Nov. 6, 1951 |
| 2,639,916 | Anness | May 26, 1953 |
| 2,753,770 | Chapman | July 10, 1956 |
| 2,757,498 | Meyer-Jagenberg et al. | Aug. 7, 1956 |
| 2,769,376 | Chidsey et al. | Nov. 6, 1956 |
| 2,863,371 | Tonna | Dec. 9, 1959 |